US012682922B2

(12) United States Patent
Abe et al.

(10) Patent No.: US 12,682,922 B2
(45) Date of Patent: Jul. 14, 2026

(54) SIMULTANEOUSLY WRITING DATA TO TWO SETS OF CHANNELS IN A TAPE MEDIA TO INCREASE CHANNEL TRANSFER RATE

(71) Applicant: INTERNATIONAL BUSINESS MACHINES CORPORATION, Armonk, NY (US)

(72) Inventors: Atsushi Abe, Ebina (JP); Tsuyoshi Miyamura, Yokohama (JP); Hiroshi Itagaki, Yokohama (JP); Tohru Hasegawa, Tokyo (JP); Shinsuke Mitsuma, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/955,008

(22) Filed: Nov. 21, 2024

(65) Prior Publication Data

US 2026/0141918 A1     May 21, 2026

(51) Int. Cl.
*G11B 5/008* (2006.01)
*G11B 5/09* (2006.01)

(52) U.S. Cl.
CPC .............. *G11B 5/0083* (2013.01); *G11B 5/09* (2013.01)

(58) Field of Classification Search
CPC ................................. G11B 5/0083; G11B 5/09
See application file for complete search history.

(56) References Cited

U.S. PATENT DOCUMENTS

| | | | | |
|---|---|---|---|---|
| 5,992,783 | A * | 11/1999 | Trabert | G11B 5/78 |
| | | | | 242/348 |
| 11,048,640 | B2 | 6/2021 | Miyamura et al. | |
| 11,152,018 | B1 * | 10/2021 | Hasegawa | G11B 15/66 |
| 11,176,964 | B1 * | 11/2021 | Hasegawa | G11B 20/1201 |
| 11,222,659 | B1 | 1/2022 | Goker | |
| 11,437,062 | B1 * | 9/2022 | Miyamura | G11B 27/107 |
| 2021/0366519 | A1 | 11/2021 | Biskeborn | |
| 2023/0317106 | A1 | 10/2023 | Nakao et al. | |
| 2024/0177737 | A1 * | 5/2024 | Noda | G11B 5/00813 |

* cited by examiner

*Primary Examiner* — Steven Lim
*Assistant Examiner* — Michelle J. Kim
(74) *Attorney, Agent, or Firm* — Konrad, Raynes, Davda & Victor LLP; David Victor

(57) ABSTRACT

Provided are a tape head controller, tape drive, and method for simultaneously writing data to two sets of channels to increase channel transfer rate. A tape head module having a first and second sets of read/write elements is positioned to have the first set of read/write elements on a selected wrap number in a first n channels in a first data band and the second set of read/write elements on the selected wrap number in a second n channels in a second data band. The first set and the second set of read/write elements are controlled to simultaneously perform read/write operations with respect to the selected wrap number in the first n channels and the second n channels, respectively. A combination of the first n channels and the second n channels is presented as a 2n-channel layout with a plurality of wraps in each of n channels.

20 Claims, 7 Drawing Sheets

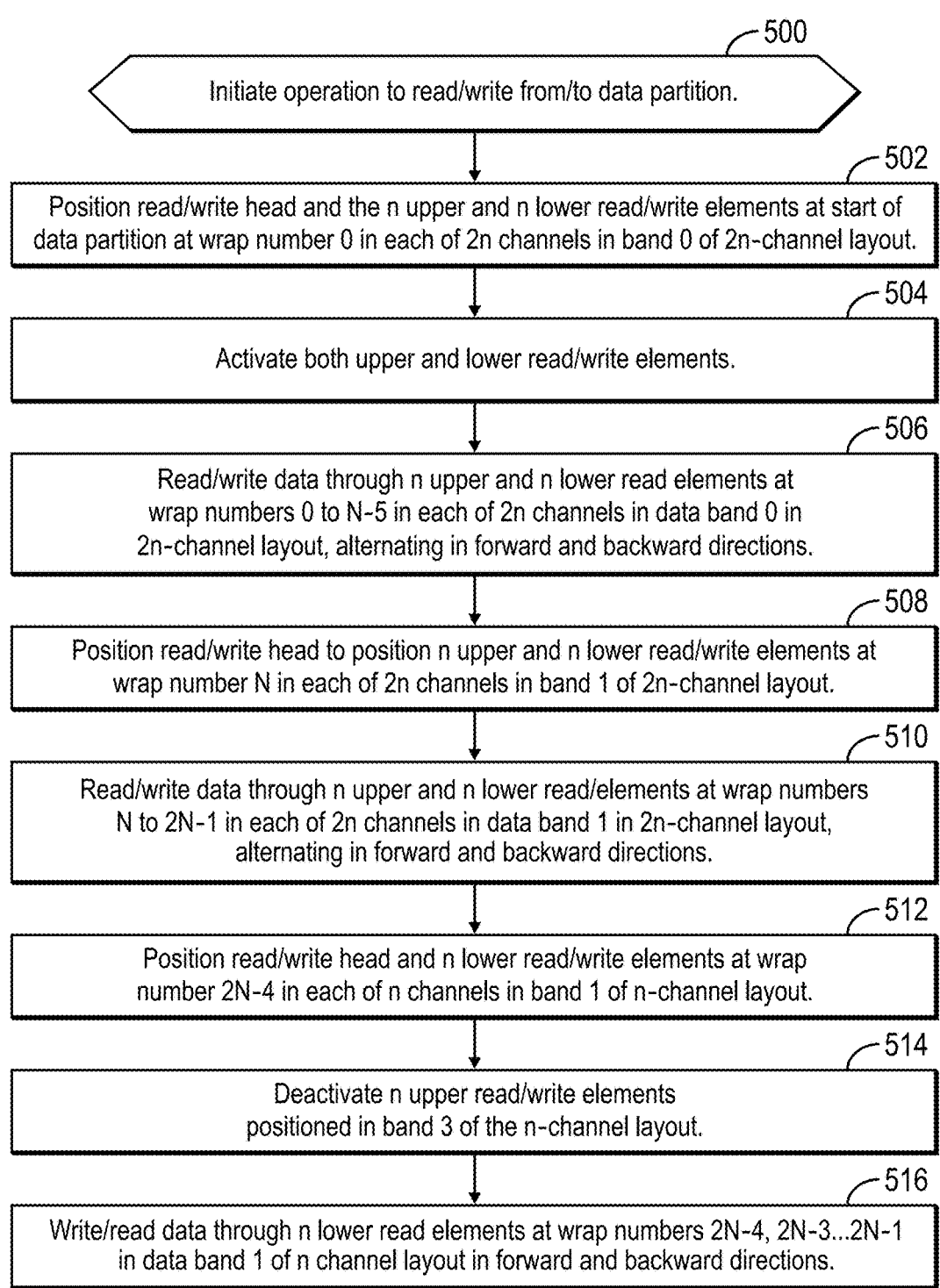

500

Initiate operation to read/write from/to data partition.

502

Position read/write head and the n upper and n lower read/write elements at start of data partition at wrap number 0 in each of 2n channels in band 0 of 2n-channel layout.

504

Activate both upper and lower read/write elements.

506

Read/write data through n upper and n lower read elements at wrap numbers 0 to N-5 in each of 2n channels in data band 0 in 2n-channel layout, alternating in forward and backward directions.

508

Position read/write head to position n upper and n lower read/write elements at wrap number N in each of 2n channels in band 1 of 2n-channel layout.

510

Read/write data through n upper and n lower read/elements at wrap numbers N to 2N-1 in each of 2n channels in data band 1 in 2n-channel layout, alternating in forward and backward directions.

512

Position read/write head and n lower read/write elements at wrap number 2N-4 in each of n channels in band 1 of n-channel layout.

514

Deactivate n upper read/write elements positioned in band 3 of the n-channel layout.

516

Write/read data through n lower read elements at wrap numbers 2N-4, 2N-3...2N-1 in data band 1 of n channel layout in forward and backward directions.

FIG. 4

SIMULTANEOUSLY WRITING DATA TO TWO SETS OF CHANNELS IN A TAPE MEDIA TO INCREASE CHANNEL TRANSFER RATE

BACKGROUND OF THE INVENTION

1. Field of the Invention

Provided are a tape head controller, tape drive, and method for simultaneously writing data to two sets of channels to increase channel transfer rate.

2. Description of the Related Art

In magnetic storage systems, data is read from and written onto magnetic recording media utilizing magnetic read and write elements formed on a tape head. Data is written on the magnetic recording media by moving a magnetic recording transducer to a position over the media where the data is to be stored. The magnetic recording transducer generates a magnetic field, which encodes the data into the magnetic media. Data is read from the media by similarly positioning the magnetic read element and then sensing the magnetic field of the magnetic media.

In the Linear Tape Open (LTO) standard the drive comprises a linear tape drive that writes linear tape data on a line from the beginning of physical tape to and end of the physical tape in the long direction linearly. One line from the beginning of physical tape to the end of physical tape or from the end of the physical tape is called a "wrap". The number of wraps in each channel may differ depending on the tape drive product specifications.

After writing in a wrap from the beginning to the end of the tape, in either longitudinal direction, the tape drive shifts the tape head in the lateral or vertical direction to a next wrap and writes from the end of the physical tape to the beginning of the physical tape in that next wrap. This behavior is repeated in the entire tape area. In other words, the linear tape drive writes data with many reciprocating motions.

Current generation tape drives include 32 channels of data in each of four data bands, with a same number of wraps in each of the channels. A tape head typically includes 32 read/write elements to write to the same wrap offset in each of the 32 channels.

SUMMARY

Provided are a tape head controller, tape drive, and method for simultaneously writing data to two sets of channels to increase channel transfer rate. A tape head module has a first and second sets of read/write elements. The tape head module is positioned to have the first set of read/write elements on a selected wrap number in a first n channels in a first data band in the tape media and the second set of read/write elements on the selected wrap number in a second n channels in a second data band in the tape media. The first set and the second set of read/write elements are controlled to simultaneously perform read/write operations with respect to the selected wrap number in the first n channels and the second n channels, respectively, wherein a combination of the first n channels and the second n channels is presented as a 2n-channel layout with a plurality of wraps in each of n channels.

BRIEF DESCRIPTION OF THE DRAWINGS

FIG. 4 illustrates an embodiment of operations to write data to a data partition in the channels of the bands.

DETAILED DESCRIPTION

Described embodiments provide improved tape drive technology to increase the transfer rate of data to the tape media without having to increase the tape speed or tape track density. Described embodiments provide a tape head having two sets of read/write elements to simultaneously read/write to each of n channels in two different data bands. For a tape layout having four data bands, each with 32 channels of wraps, described embodiments provide two sets each of 32 read/write elements to simultaneously read/write at 32 channels in the two different data bands.

Described embodiments write the index partition by only activating the upper set of the 32 read/write elements to read/write to a subset of wraps in only 32 channels in one data band. At the same time, the lower set of 32 read/write elements is deactivated when writing the index partition. These lower 32 channels may be used to store data when writing to the data partition.

Described embodiments speed up the transfer rate for transferring data by having two sets of read/write heads simultaneous write to a wrap in different channels in two different bands in a 32-channel layout that form 32 channels in one band in a 64-channel layout.

Figure 1:
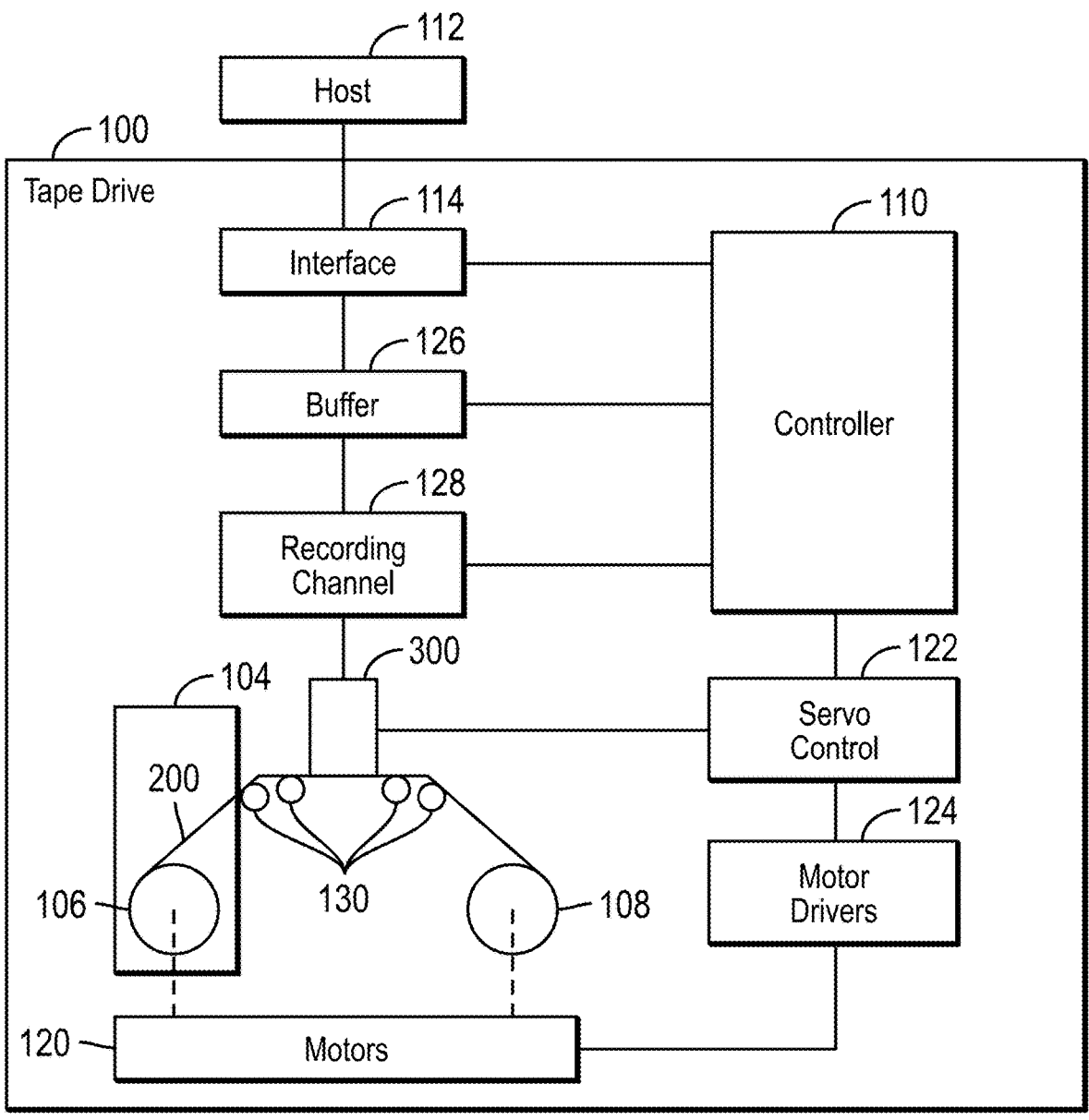
FIG. 1 illustrates an embodiment of a tape drive system in which embodiments are implemented.

FIG. 1 illustrates an embodiment of a tape drive 100, or tape device, to read and write with respect to a magnetic tape 200 of a magnetic tape cartridge 104. The magnetic tape cartridge 104 comprises a length of magnetic tape 200 wound on one or two reels 106, 108. By way of example, the magnetic tape cartridge 104 may comprise a single reel tape, such as adhering to the Linear Tape Open (LTO) format. An example of a tape drive 100 is the International Business Machines Corporation TS1160 Tape Drive. Other implementations of the tape cartridge 104 and tape drive may also be used, such as LTO type tape drives.

The tape drive 100 may further include one or more controllers 110 to operate the tape drive 100 in accordance with commands received from a host system 112 received at an interface 114. The controller 110 includes logic and/or one or more microprocessors with a memory for storing information and program information for operating the microprocessor(s). The tape drive 100 may comprise a standalone unit or comprise a part of a tape library or other subsystem. The tape drive 100 may be coupled to the host system 112 directly, through a library, or over a network, and employ at interface 114 a Small Computer Systems Interface (SCSI), an optical fiber channel interface, etc.

The tape cartridge 104 may be inserted in the tape drive 100 and loaded by the tape drive 100 mechanisms so that one or more read and/or write elements on a tape head 300 reads and/or writes information in the form of signals with respect to the magnetic tape 200 as the tape is moved longitudinally by one or more motors 120 which rotate the reels 106, 108. Tape guide rollers 130 guide the tape 200 across the tape head 300 to stabilize the positioning of the tape 200 with respect to the head 300 to reduce position error signals (PES). The magnetic tape 200 typically comprises a plurality of parallel tracks, or groups of tracks. In some formats, such as the LTO format, the tracks are arranged in a serpentine back and forth pattern of separate wraps.

The recording system may comprise a servo control system 122 to adjust the skew angle of the tape head 300 and/or adjust the position of the head 300 to seek and move the tape head laterally on the tape media 200, to position the read and write elements at a desired wrap or wraps, and to track-follow the desired wrap or wraps. The tape head 300 can also be skewed relative to the tape media 202. The servo control system 122 may also control the operation of the motors 120 through motor drivers 124 and in response to instructions from the controller 110.

The controller 110 also provides the data flow and formatter for data to be read from and written to the tape, employing a buffer 126 and a recording channel 128. The controller 110 may comprise program code in a memory device that is loaded into a processor and executed to perform the tape drive operations. Alternatively, some or all of the functions of the controller 110 may be implemented as microcode or firmware in hardware devices in the tape drive 100, such as in Application Specific Integrated Circuits (ASICs), Field Programmable Gate Array (FPGA), etc. The buffer 126 may comprise a suitable volatile or non-volatile memory device known in the art.

Figure 2A:
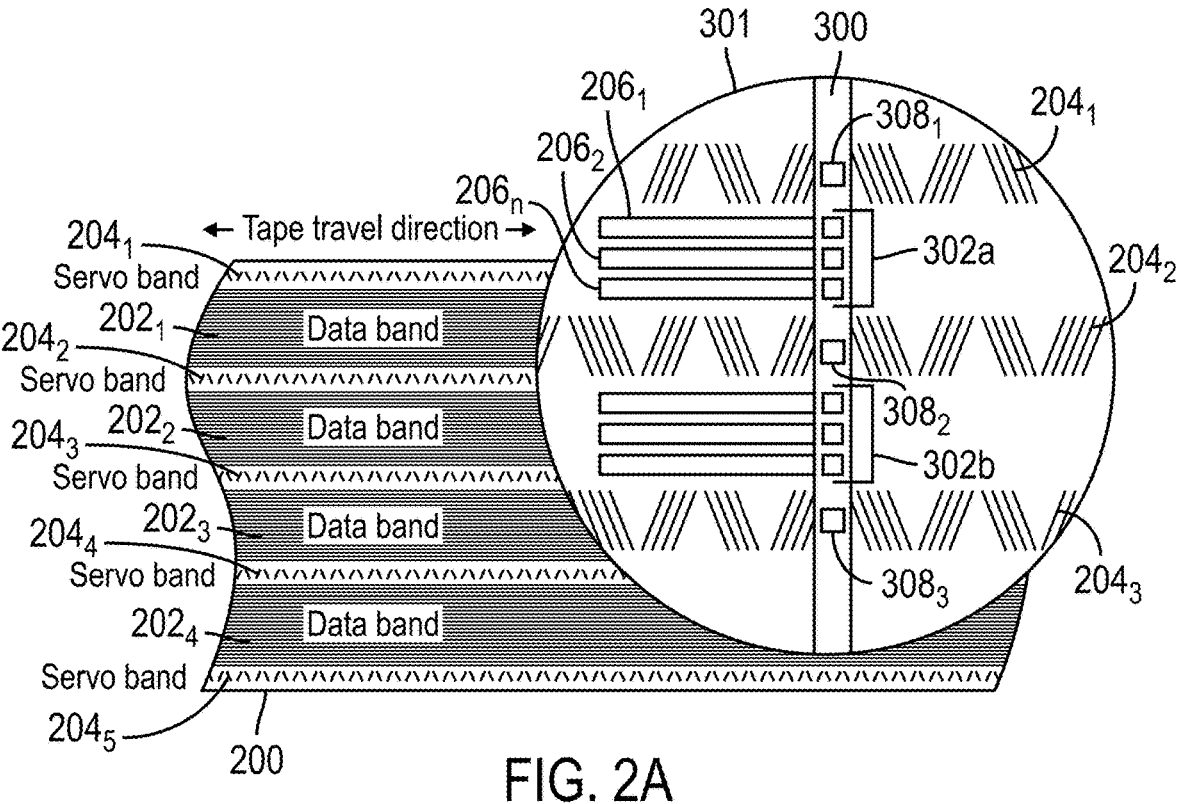
FIGS. 2A, 2B, 2C, 2D illustrate embodiments of a tape medial channel layout and tape head positioned on the tape media.

FIG. 2A provides a magnified view 301 of the tape head 300 over data bands $202_1$, $202_2$, $202_3$, $202_4$ in the tape media 200. The tape head 300 includes upper read/write elements 302a to read/write to channels in one data band and lower read/write elements 302b to lower channels. The data bands $202_1$, $202_2$, $202_3$, $202_4$ are separated by servo bands $204_1$, $204_2$, $204_3$, $204_4$, $204_5$. Server readers $308_1$, $308_2$, $308_3$ read servo patterns in the servo bands to determine a position of the read/write head 300 and read/write elements 302a 302b to use to position the read/write elements laterally on specific wraps/tracks within n channels $206_1$, $206_2$ . . . $206_n$ in the data bands at specific longitudinal position within a wrap. Within each data band $204_i$, where i can designate any data band number, e.g., data bands 0, 1, 2, 3, there may be 32 channels. Each channel may include a number of N wraps, such as 16 wraps or any number of wraps supported in the tape media 200. In such an implementation of 32 channels per data band, there are 32 upper 302a and 32 lower 302b read/write elements in the head 300 to allow each upper and lower read/write elements to concurrently read/write at a same wrap location offset in 32 upper and 32 lower channels, respectively. Although there are described 32 channels per band, there may be any number of n channels and any number N of wraps/tracks in each channel.

Figure 2B:
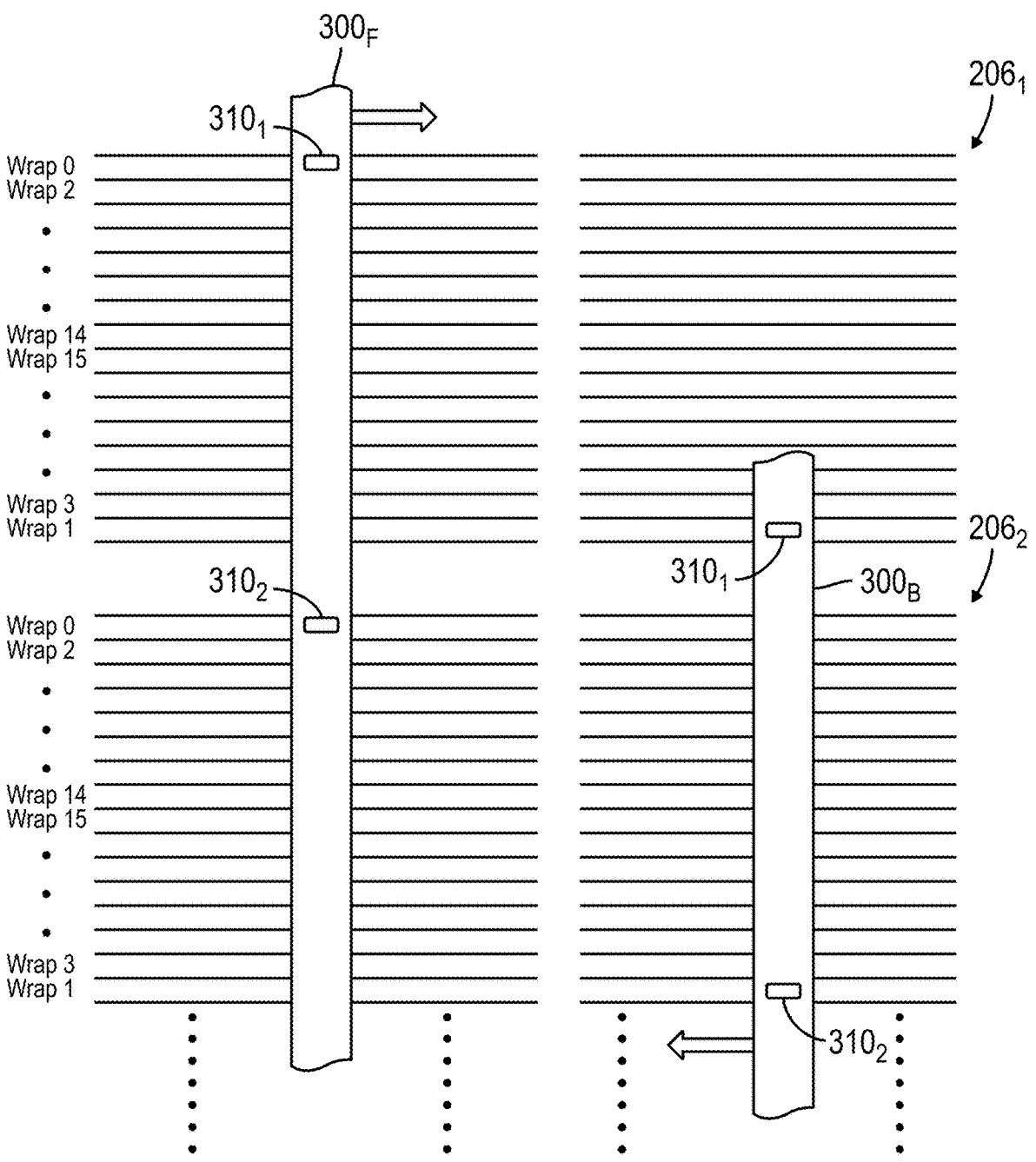

FIG. 2B shows two channels $206_1$, $206_2$ in the tape media 200. Each channel 206; has 16 wraps, by way of example. Although only two channels $206_1$, $206_2$ are shown with 16 wraps each, there may be additional channels, each channel having N wraps. The head 300 is shown to read/write in the forward direction $300_F$ and in a backward direction $300_B$. The head $300_F$ and $300_B$ has read/write elements $310_1$, $310_2$ to simultaneously read/write on a same wrap number in the channels $206_1$, $206_2$.

Figure 2C:
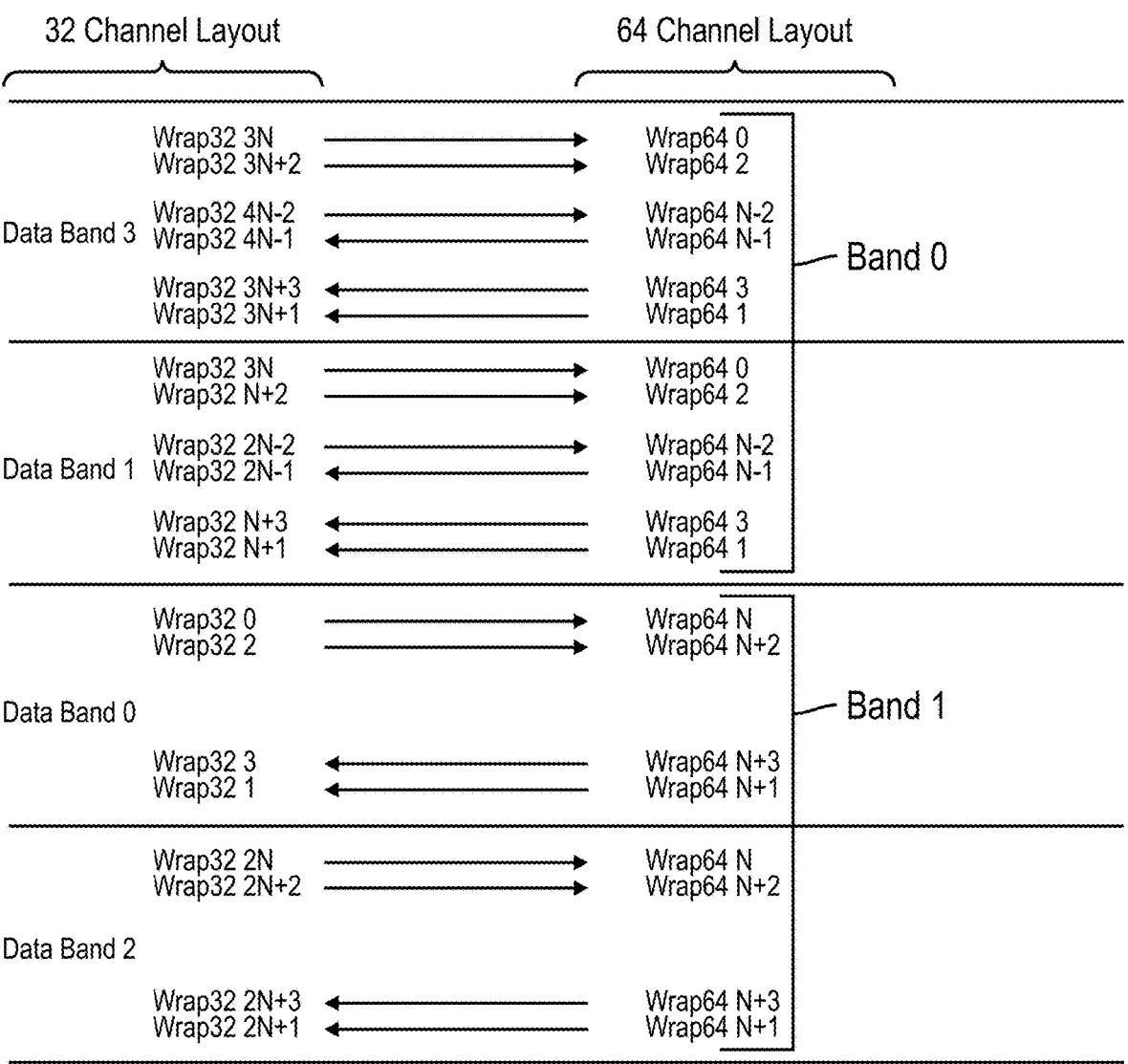

FIG. 2C shows how the controller may map bands in two different channel layouts. A 32-channel layout has four data bands 0, 1, 2, 3 and a 64-channel layout has two data bands 0, 1. "Wrap32" indicates a wrap in a 32-channel layout and Wrap64 indicates a wrap in a 64 channel layout. The 32-channel layout side shows N wraps in one channel from wraps 0 . . . N−1 in data band 0, wraps N . . . 2N−1 in data band 1, wraps 2N . . . 3N−1 in data band 2, and wraps 3N . . . 4N−1 in data band 3. Because the head has upper and lower sets of read/write elements to read/write simultaneously to 32 channels in an upper band and 32 to channels in a lower band, the upper and lower 32-channels may map to one channel number in a single Wrap64 data band comprising two Wrap32 data bands. For instance, data band 3 and data band 1 in the 32-channel layout form one band 0 in the 64-channel layout. The 32 upper and 32 lower channels in Wrap32 data bands 3 and 1 are mapped into 32 channels in 64-channel layout data band 0. By having two sets of 32 read/write elements simultaneously writing to a same wrap offset location in each of the upper and lower 32 channels in two data bands, the head is writing to n channels in one 64 channel layout data band. For instance, Wrap32 3N and Wrap32 N map to Wrap64 0. Likewise, Wrap32 0 and Wrap32 2N map to Wrap64 N.

FIG. 2C illustrates one method of how the controller 110 maps 64 wrap numbers 3N to 3N−1 and N to 2N−1 in 64 Wrap32 channels in data bands 3 and 1 to 32 wrap numbers 0 to N−1 in one 64-channel band 0. Further, the controller 110 maps 64 wrap numbers 0 to N−1 and 2N to 3N−1 in 64 Wrap32 channels in data bands 0 and 2 to 32 wrap numbers N to 2N−1 in one 64 channel band 1. In this way, writing simultaneously to two channels in a 32-channel layout maps to writing to one channel in a 64 channel layout.

Figure 2D:
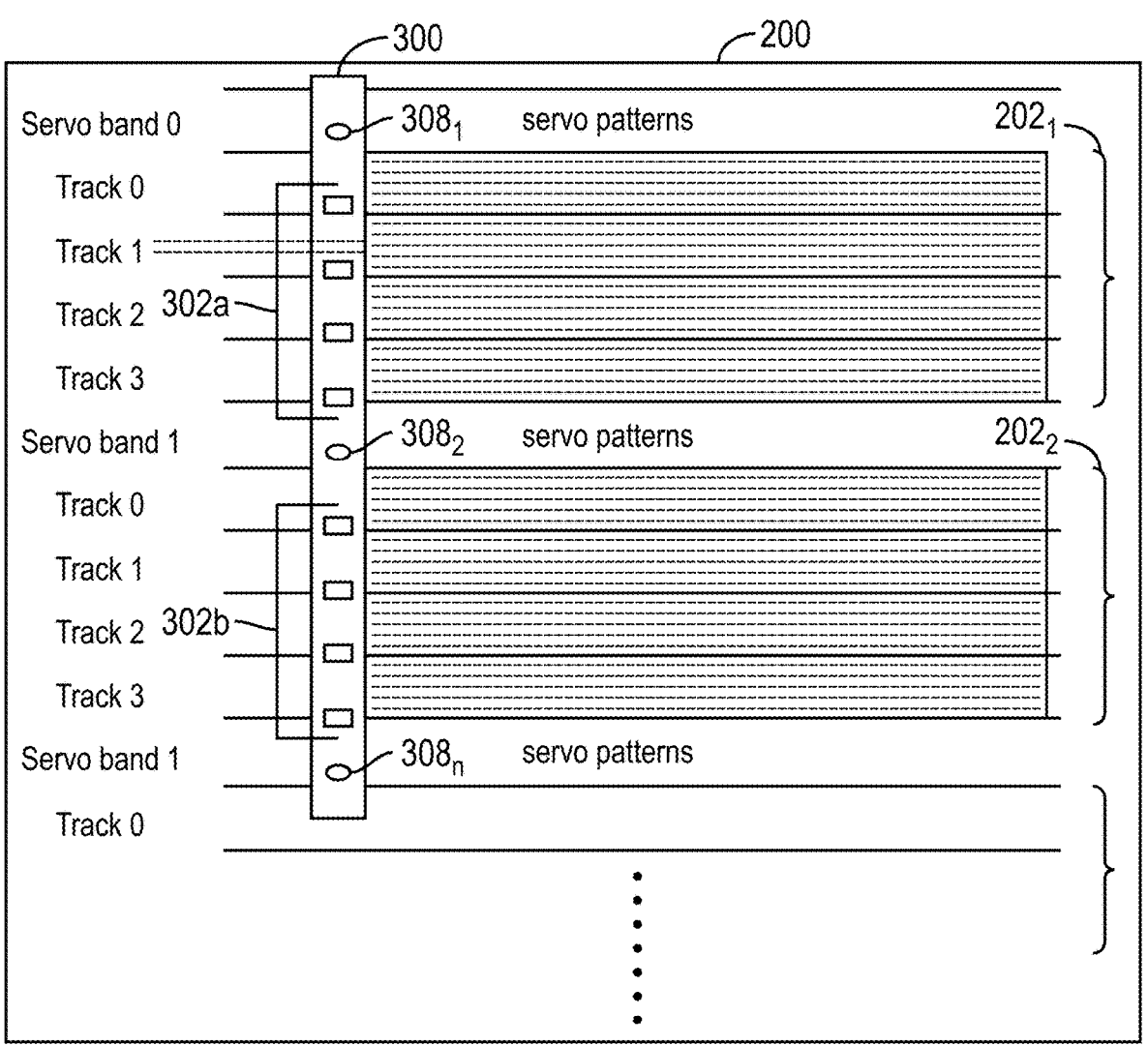

FIG. 2D further illustrates how the wraps may map to tracks, such that in an N wrap channel, there are N wraps/tracks in each channel. FIG. 2D shows read/write elements 302A and 302B reading/writing simultaneously to two wraps/tracks in separate upper and lower bands. In this way, 2N wraps in two Wrap32 channels in two data bands map to N Wrap64 wraps in each of 64 channels in a single data band. This doubles the size of each wrap, but reduces the number of wraps by half.

Figure 3:
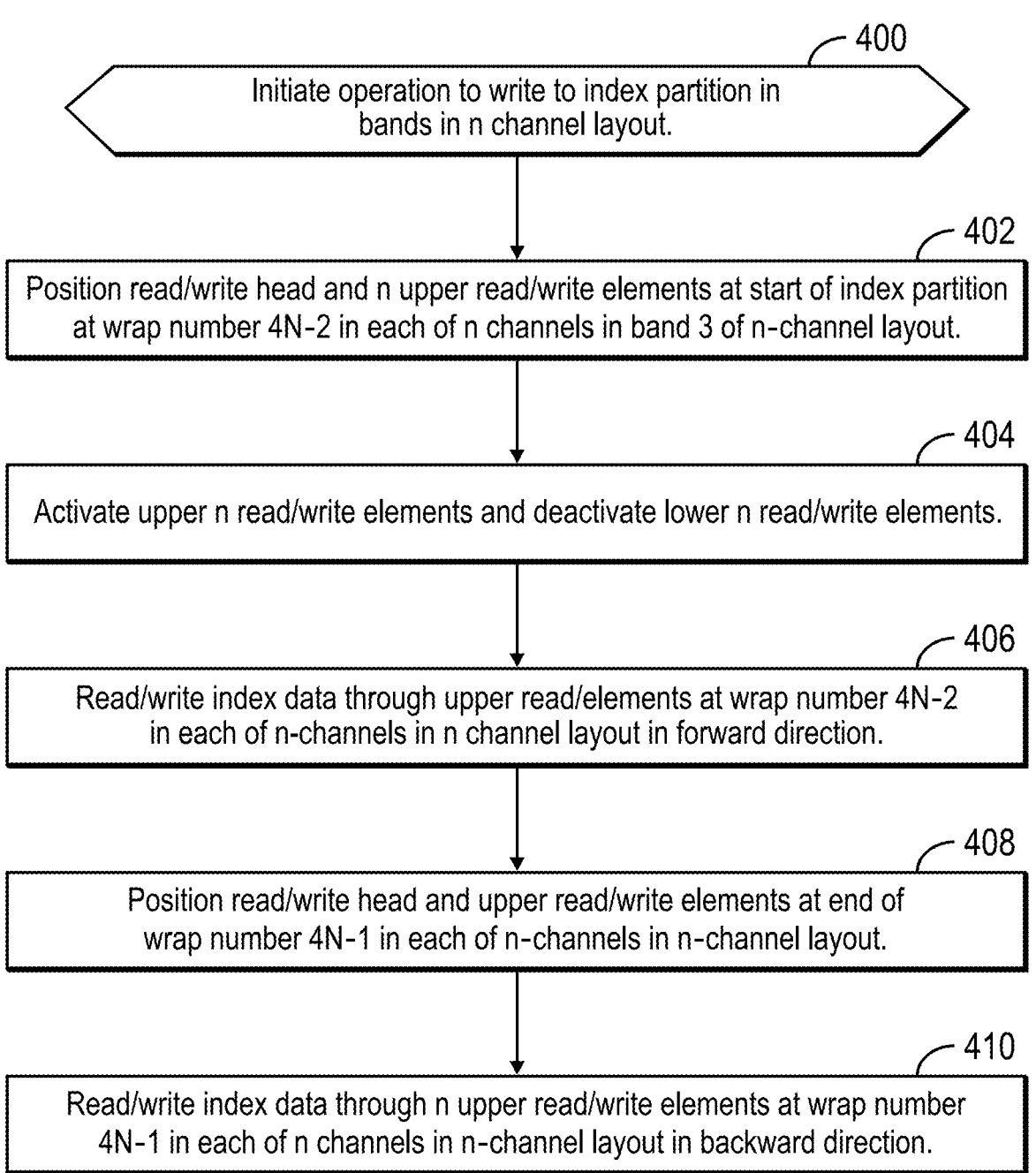
FIG. 3 illustrates an embodiment of operations to write index data to an index partition in the channels of the bands.

FIG. 3 illustrates an embodiment of operations performed by the controller 110 to read/write index data to a subset of wraps in a data band in a 32-channel layout. Upon initiating (at block 400) operations to read/write an index partition, the controller 110 generates signals to control the servo control system 122 to control (at block 402) the motor drivers 124 to position the read/write head 300 and n upper read/write elements, e.g., 302a, at start of index partition at wrap number 4N−2 in each of n channels in band 3 of the n-channel layout. In the above examples, n is 32 and N may be some number of wraps/tracks in each n-channel layout, which may vary among vendors. The controller activates (at block 404) the upper read/write elements, such as 302a, and deactivates the lower read/write elements, such as 302b. The controller then controls (at block 406) the upper read/write elements to read/write index data at the index partition in wrap 4N−2 in each of n-channels in the n-channel layout in the forward direction. After writing in the forward direction, the controller positions (at block 408) the read/write head and upper read/write elements at the end of wrap 4N−1 in each of the n-channels in the n-channel layout and read/writes (at block 410) index data through the n upper read/write elements in the backward direction at wrap number 4N−1 in each of the n channels.

With the operations in FIG. 3, the index data is only written to wrap numbers in n-channels in an upper band of the n-channel layout and the lower read/write elements are inactive and not writing to the wraps in the lower band over which the lower read/write elements are positioned.

FIG. 4 illustrates an embodiment of operations performed by the controller 110 to read/write user data to wraps in a data band in a 2n-channel layout, such as a 64-channel layout, where each of the 32 Wrap64 channels comprises two channels in the 32-channel layout. In this way, each Wrap64 channel includes wraps from two Wrap32 channels, thus having double the size of a Wrap32 channel. Upon initiating (at block 500) operations to read/write data to a data partition, the controller generates (at block 502) signals to position the read/write head and the n upper and n lower read/write elements at start of data partition at wrap number 0 in each of 2n channels in band 0 of 2n-channel layout. Both the upper and lower read/write elements are activated (at block 504). The controller controls (at block 506) the n upper and n lower read/write elements to read/write at wrap numbers 0 to N−5 in each of the 2n channels in data band 0 in the 2n-channel layout, alternating in forward and backward directions.

After writing to wraps not having the index data in data band 0, the controller positions (at block 508) the read/write head to position the n upper and the n lower read/write elements at wrap number N in each of 2n channels in band 1 of 2n-channel layout. The controller controls (at block 510) the n upper and n lower read/elements to read/write at wrap numbers N to 2N−1 in each of 2n channels in data band 1 in 2n-channel layout, alternating in forward and backward directions. After writing to all available 64 channel wraps in bands 0 and 1, the controller positions (at block 512) the read/write head and n lower read/write elements at wrap number 2N−4 in each of n channels in band 1 of the n-channel layout. The upper n read/write elements are deactivated (at block 514). The controller controls (at block 516) the n lower read elements to read/write at wrap numbers 2N−4, 2N−3 . . . 2N−1 in data band 1 of the n-channel layout in forward and backward directions.

With the operations of FIG. 4, the controller writes to a Wrap64 channel in the 2n or 64 channel layout by writing simultaneously to the wrap number in separate Wrap32 channels. This both increases the size of a channel by combining two separate 32-channel groups and improves the writing performance by simultaneously writing the wrap to two separate Wrap32 channels to double the throughput in writing to one Wrap64 channel. To optimize use of data storage space, data is written to the lower wrap 32 channels not written when writing index data to wrap numbers 4N−1 and 4N−2 in band 3 of the n-channel layout. The lower wrap numbers not used, when writing to the upper wrap numbers 4N−1 and 4N−2 and leaving wrap numbers 4N−3 and 4N−4 to use as guard wraps, comprise wrap numbers 2N−4, 2N−3, 2N02, and 2N−1 of the channels in data band 1 of the 32-channel (Wrap32) layout.

In the described embodiment, variables i, j, n, N, etc., when used with different elements may denote a same or different instance of that element or different number of elements.

Terms such as "top", bottom", "left", "right", "upper", lower", and the like may be used for descriptive purposes only and are not to be construed as limiting. Embodiments may be manufactured, used, and contained in a variety of positions and orientations.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape head controller for controlling a tape head to read and write to a tape media, wherein the tape head controller performs operations, the operations comprising:

positioning a tape head module having a first and second sets of read/write elements configured to simultaneously read and write to a first data band and a second data band on the tape media, respectively, wherein the first and the second data bands have wraps identified by wrap numbers, wherein the first and the second sets of read/write elements are configured to simultaneously read or write to a same wrap number in the first and the second data bands, respectively, and wherein the tape head module is positioned to have the first set of read/write elements on a selected wrap number in a first n channels in the first data band in the tape media and the second set of read/write elements on the selected wrap number in a second n channels in the second data band in the tape media; and controlling the first set and the second set of read/write elements to simultaneously perform read/write operations with respect to the selected wrap number in the first n channels and the second n channels, respectively, wherein a combination of the first n channels and the second n channels is presented as a 2n-channel layout with a plurality of wraps in each of n channels.

2. The tape head controller of claim 1, wherein the operations further comprise:

controlling the first set of read/write elements to perform read/write operations to designated wrap numbers in the first data band while the second set of read/write elements are deactivated.

3. The tape head controller of claim 2, wherein the wraps available for the 2n-channel layout include wraps in the first n channels and the second n channels excluding the designated wrap numbers in the first n channels and the second n channels.

4. The tape head controller of claim 3, wherein the designated wrap numbers in the first data band store index partition data, and wherein the wraps available in the 2n-channel layout comprise a data partition.

5. The tape head controller of claim 3, wherein the designated wrap numbers comprise wrap numbers (N−1), (N−2), (N−3), and (N−4), where N is a number of wraps in each channel, in a middle of the wraps in the first n channels and the second n channels, wherein the (N−1) and the (N−2) wrap numbers in the first data band store data and the (N−3) and the (N−4) wrap numbers comprise guard wraps to separate the data in the (N−1) and the (N−2) wrap numbers from the wraps available in the 2n-channel layout, and wherein the (N−1), the (N-2), the (N−3), and the (N−4) wrap numbers in the second n channels are available to store data.

6. The tape head controller of claim 1, wherein each of the first n channels and the second n channels include N wraps, wherein each Nth wrap number of N number of wraps in the first n channels and the second n channels combined form an Nth wrap number in the 2n-channel layout.

7. The tape head controller of claim 1, wherein the selected wrap number comprises a first selected wrap number, wherein the operations further comprise:

controlling the first set and the second set of read/write elements to simultaneously perform read/write operations with respect to a second selected wrap number in a third n channels in a third data band and in fourth n channels in a fourth data band, wherein a combination of the third n channels and the fourth n channels is presented as n channels in the 2n-channel layout.

8. The tape head controller of claim 7, wherein each of the first n channels, the second n channels, the third n channels and the fourth n channels include N wraps, wherein each ith wrap number of 0 to N−1 wrap numbers in the first n channels and the second n channels combined form an ith wrap number in n channels of the 2n-channel layout and wherein each jth wrap number of N to 2N−1 wrap numbers in the third n channels and the fourth n channels combined form a form a jth wrap number in n channels of the 2n-channel layout.

9. A tape drive to read and write to a tape media, comprising:

a tape head module having first and second sets of read/write elements configured to simultaneously read and write to a first data band and a second data band on the tape media, respectively, wherein the first and the second data bands have wraps identified by wrap numbers, wherein the first and the second sets of read/write elements are configured to simultaneously read or write to a same wrap number in the first and the second data bands, respectively; and a tape controller for controlling the tape head module to read and write to the tape media, wherein the tape controller performs operations, the operations comprising:

positioning the tape head module to have the first set of read/write elements on a selected wrap number in a first n channels in the first data band in the tape media and the second set of read/write elements on the selected wrap number in a second n channels in the second data band in the tape media; and controlling the first set and the second set of read/write elements to simultaneously perform read/write operations with respect to the selected wrap number in the first n channels and the second n channels, respectively, wherein a combination of the first n channels and the second n channels is presented as a 2n-channel layout with a plurality of wraps in each of n channels.

10. The tape drive of claim 9, wherein the tape controller operations further comprise:

controlling the first set of read/write elements to perform read/write operations to designated wrap numbers in the first data band while the second set of read/write elements are deactivated.

11. The tape drive of claim 10, wherein the wraps available for the 2n-channel layout include wraps in the first n channels and the second n channels excluding the designated wrap numbers in the first n channels and the second n channels.

12. The tape drive of claim 11, wherein the designated wrap numbers in the first data band store index partition data, and wherein the wraps available in the 2n-channel layout comprise a data partition.

13. The tape drive of claim 9, wherein each of the first n channels and the second n channels include N wraps, wherein each Nth wrap number of N number of wraps in the first n channels and the second n channels combined form an Nth wrap number in the 2n-channel layout.

14. The tape drive of claim 9, wherein the selected wrap number comprises a first selected wrap number, wherein the tape controller operations further comprise:

controlling the first set and the second set of read/write elements to simultaneously perform read/write operations with respect to a second selected wrap number in a third n channels in a third data band and in a fourth n channels in a fourth data band, wherein a combination of the third n channels and the fourth n channels is presented as n channels in the 2n-channel layout.

15. A method for controlling a tape head to read and write to a tape media, comprising:

positioning a tape head module having a first and second sets of read/write elements configured to simultaneously read and write to a first data band and a second data band on the tape media, respectively, wherein the first and the second data bands have wraps identified by wrap numbers, wherein the first and the second sets of read/write elements are configured to simultaneously read or write to a same wrap number in the first and the second data bands, respectively, and wherein the tape head module is positioned to have the first set of read/write elements on a selected wrap number in a first n channels in the first data band in the tape media and the second set of read/write elements on the selected wrap number in a second n channels in the second data band in the tape media; and controlling the first set and the second set of read/write elements to simultaneously perform read/write operations with respect to the selected wrap number in the first n channels and the second n channels, respectively, wherein a combination of the first n channels and the second n channels is presented as a 2n-channel layout with a plurality of wraps in each of n channels.

16. The method of claim 15, further comprising:

controlling the first set of read/write elements to perform read/write operations to designated wrap numbers in the first data band while the second set of read/write elements are deactivated.

17. The method of claim 16, wherein the wraps available for the 2n-channel layout include wraps in the first n channels and the second n channels excluding the designated wrap numbers in the first n channels and the second n channels.

18. The method of claim 17, wherein the designated wrap numbers in the first data band store index partition data, and wherein the wraps available in the 2n-channel layout comprise a data partition.

19. The method of claim 15, wherein each of the first n channels and the second n channels include N wraps, wherein each Nth wrap number of N number of wraps in the first n channels and the second n channels combined form an Nth wrap number in the 2n-channel layout.

20. The method of claim 15, wherein the selected wrap number comprises a first selected wrap number, wherein the tape controller operations further comprise:

controlling the first set and the second set of read/write elements to simultaneously perform read/write operations with respect to a second selected wrap number in a third n channels in a third data band and in a fourth n channels in a fourth data band, wherein a combination of the third n channels and the fourth n channels is presented as n channels in the 2n-channel layout.

* * * * *